United States Patent [19]

Cronauer et al.

[11] 4,116,808

[45] Sep. 26, 1978

[54] PROCESS FOR HYDROGENATING A SOLID CARBONACEOUS MATERIAL WITH Ni/Ti/Mo ON A MAGNESIUM-DEFICIENT MAGNESIUM ALUMINATE SPINEL-AS CATALYST

[75] Inventors: Donald C. Cronauer, Gibsonia; William L. Kehl, Pittsburgh, both of Pa.

[73] Assignee: Gulf Research & Development Company, Pittsburgh, Pa.

[21] Appl. No.: 840,899

[22] Filed: Oct. 11, 1977

Related U.S. Application Data

[63] Continuation-in-part of Ser. No. 707,521, Aug. 6, 1976.

[51] Int. Cl.² .................................................. C10G 1/08
[52] U.S. Cl. ..................................................... 208/10
[58] Field of Search .................. 252/463, 465, 466 J; 208/10

[56] References Cited

U.S. PATENT DOCUMENTS

| | | | |
|---|---|---|---|
| 3,459,657 | 8/1969 | Krönig | 252/466 J |
| 3,619,404 | 11/1971 | Rieve et al. | 208/10 |
| 3,728,252 | 4/1973 | Pitchford | 208/243 |
| 3,751,508 | 8/1973 | Fujiso et al. | 252/463 |
| 4,019,975 | 4/1977 | Urquhart | 208/10 |
| 4,049,582 | 9/1977 | Erickson | 252/463 |

*Primary Examiner*—Delbert E. Gantz
*Assistant Examiner*—Joan Thierstein

[57] ABSTRACT

A process for hydrogenating a carbonaceous material using a novel hydrogenation catalyst comprising a hydrogenation metal mounted on a magnesium-deficient magnesium aluminate spinel.

7 Claims, 2 Drawing Figures

PROCESS FOR HYDROGENATING A SOLID CARBONACEOUS MATERIAL WITH NI/TI/MO ON A MANGESIUM-DEFICIENT MAGNESIUM ALUMINATE SPINEL-AS CATALYST

This application is a continuation-in-part application of our U.S. patent application Ser. No. 707,521, filed Aug. 6, 1976, entitled Hydrogenating Catalyst and Process for Preparing Same.

BACKGROUND OF THE INVENTION

1. Field of the Invention

This invention relates to a process for using a hydrogenation catalyst wherein the support thereof is a specific magnesium-deficient magnesium aluminate spinel for the hydrogenation of a carbonaceous material, such as coal.

2. Description of Prior Art

The use of magnesium aluminate ($MgAl_2O_4$) as a support for a catalytic metal and the use of such catalyst for the hydrogenation of coal is shown in U.S. Pat. No. 3,728,252 to Pitchford. Since the hydrogenation of coal is generally accompanied by the formation of by-product carbon, which tends to coat the catalyst and thereby deactivate the same, it is the desire of those who operate in such art to reduce the carbon deposition on the hydrogenation catalyst in order to maintain its hydrogenation activity over extended periods of time.

SUMMARY OF THE INVENTION

We have found that in the hydrogenation of a solid carbonaceous material, such as coal, in the presence of a hydrogenation catalyst mounted on a magnesium aluminate spinel, the amount of carbon deposited on the support is appreciably reduced if the hydrogenation is conducted in the presence of the novel catalyst claimed in our said application Ser. No. 707,521, namely, a hydrogenation catalyst mounted on a specific magnesium-deficient magnesium aluminate spinel of the following formula:

$$Mg_xAl_2O_{3+x}$$

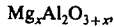

wherein $x$ is a number ranging from about 0.10 to about 0.40, preferably in the range of about 0.20 to about 0.30.

The preparation of the novel catalyst herein can be carried out using conventional techniques which will assure the presence in the support of the components thereof in the above defined amounts. Thus, a convenient method involves dissolving a magnesium salt and an aluminum salt in water wherein the molar ratio of the magnesium metal to the aluminum metal in the aqueous solution is in the range of about 0.10:2 to about 0.40:2, preferably about 0.2:2 to about 0.3:2. Representative magnesium salts that can be used include magnesium chloride, magnesium nitrate, magnesium sulfate, etc. Representative aluminum salts that can be used include aluminum chloride, aluminum nitrate, aluminum sulfate, etc. There is then prepared an alkali-metal free aqueous basic solution, using, for example, ammonium hydroxide or ammonium carbonate, having a pH of about 9 to about 14, preferably about 11 to about 12.

The two solutions defined above are separately and continuously introduced into a vessel containing water, which is continuously stirred. The two streams are introduced into the water so as to maintain the pH of the resulting mixture in the range of about 8.5 to about 10, preferably in the range of about 9 to about 9.5. The addition of these solutions to water is continued until the magnesium-aluminum salt solution is exhausted. However, the mixture is stirred for an additional 15 to 30 minutes to assure completion of the desired reaction.

The resulting product is filtered and the filter cake then washed with water to remove the ammonium salts therefrom. The filter cake is dried in flowing air at a temperature of about 110° to about 130° C. to remove water therefrom and then calcined in air at a temperature of about 500° to about 550° C. for about 12 to about 20 hours. The resulting material obtained is the specific magnesium-deficient magnesium aluminate spinel defined above.

The deposition of hydrogenation catalyst on the magnesium-deficient magnesium aluminate spinel so obtained can be effected in any conventional manner. For example, if one desired to place nickel, titanium and molybdenum on the novel magnesium-deficient magnesium aluminate spinel support herein, these can be deposited on the support sequentially as follows. First the support is impregnated with a solution of a molybdenum salt, for example, $(NH_4)_6Mo_7O_{24} \cdot 4H_2O$, dried at 121° C. and then calcined in air at 538° C. over a period of 10 hours. The product then obtained is impregnated with a nickel salt, such as $Ni(NO_3)_2 \cdot 6H_2O$, dried at 121° C. and then calcined in air at 538° C. for 10 hours. Finally, the treated product is impregnated with a titanium salt, for example $TiCl_4$ in dilute ammonia, dried at 121° C. and then calcined in air over a period of 10 hours. In another example if the hydrogenation catalysts used were nickel, cobalt and molybdenum, the magnesium-deficient magnesium aluminate spinel herein can be impregnated with the molybdenum salt, for example, as defined above, dried at 121° C., impregnated with a solution containing nickel nitrate and cobalt nitrate, dried at 121° C. and then calcined at 538° C. over a period of 10 hours. The materials obtained in each case will be the novel catalysts claimed herein.

Any hydrogenation catalyst well-known to those having ordinary skill in the art can be employed herein, but preferably the catalyst comprises at least one hydrogenating component selected from the group consisting of the metals, metal sulfides and/or metal oxides of (a) a combination of about 2 to about 25 percent (preferably about 4 to about 16 percent) by weight molybdenum and at least two iron group metals where the iron group metals are present in such amounts that the atomic ratio of each iron group metal with respect to molybdenum is less than about 0.4 and (b) a combination of about 5 to about 40 percent (preferably about 10 to about 25 percent) by weight of nickel and tungsten where the atomic ratio of tungsten to nickel is about 1:0.1 to 5 (preferably about 1:0.3 to about 4), said hydrogenating component being composited with a porous support. Those preferred among the hydrogenating metals are nickel, cobalt, titanium, molybdenum and tungsten. Catalysts of type "(a)" may contain molybdenum in the amounts conventionally used, i.e., about 2 to about 25 percent molybdenum based on the total weight of the catalyst including the porous carrier. Smaller amounts of molybdenum than about 2 percent may be used, but this reduces the activity. Larger amounts than about 25 percent can also be used but do not increase the activity and constitute an extra expense. We prefer to utilize a catalyst containing about 4 to about 16 percent by weight molybdenum, most preferably about 8 percent; about 2 to about 10 percent by weight nickel, most preferably about 3 percent, and about 1 to about 5 percent by weight cobalt, most preferably about 1.5 percent, or about 2 to about 10 percent by weight titanium, most preferably about 5 percent. While a three-metal component catalyst as in (a) is preferred, we can also use two-metal component catalyst as in "(b)". When using a two-metal component catalyst, we prefer to utilize one containing about 15 to about 25 percent (e.g., about 19 percent) tungsten and about 2 to about 10 percent (e.g., about 6 percent) nickel supported on the carrier. In a two-metal component catalyst, the weight ratio of tungsten to nickel is preferably in the range of about 2:1 to about 4:1 tungsten to nickel, respectively. The amounts of the iron group metals in (a) and (b) may be varied as long as the above proportions are used. However, in (a) we prefer to utilize one iron group metal in an atomic ratio between about 0.1 and about 0.2 and to use the other iron group metal or metals in an atomic ratio of iron group metal to molybdenum of less than about 0.1 and especially between about 0.05 and about 0.1. All of the iron group metals may be present but we prefer to use only two. The amount of the hydrogenating component based on the metal itself can suitably be from about 0.5 to about 60 percent by weight of the catalyst including the defined support, but is usually within the range of about 2 to about 30 percent by weight of the catalyst including the carrier. The above-mentioned active hydrogenating components can also be present as mixtures. On the other hand, chemical combinations of the iron group metal oxides or sulfides with the molybdenum oxide and/or sulfide can be utilized.

The support defined herein will have a pore volume of about 0.25 to about 0.8 cubic centimeters per gram, preferably about 0.45 to about 0.8 cubic centimeters per gram, an average pore diameter of about 80 to about 130 Å, preferably about 80 to about 115 Å, and a surface area of about 70 to about 350 square meters per gram, preferably about 250 to about 300 square meters per gram.

As pointed out above, we have found that if a solid carbonaceous material, such as coal, is hydrogenated in the presence of a hydrogenation catalyst deposited on the novel magnesium-deficient magnesium aluminate spinel defined above, less carbon is deposited per unit surface area of the catalyst than if magnesium aluminate spinel ($MgAl_2O_4$) is used as a support for the catalytic metal.

The process comprises blending the carbonaceous material, finely ground, with a solvent to form a slurry. The slurry is then introduced, together with hydrogen, into a reaction vessel containing the hydrogenation catalyst defined above. After hydrogenation, solids that are present can be removed from the product stream. The product stream is then stripped of solvent, the amount of solvent so stripped being sufficient for recycle purposes for blending with additional amounts of carbonaceous material to form a slurry. The balance of the product stream, not recycled, can thereafter be subjected to distillation to obtain products of various boiling ranges. Some of the products are useful per se as fuels. The remainder can further be treated by conventional petroleum processes, including cracking, hydrocracking, hydrotreating, etc.

In an embodiment of the invention, the slurry of solid carbonaceous material and solvent is predigested with hydrogen in the absence of catalyst at a pressure lower than that employed during the catalytic hydrogenation. The hydrogenation predigestion pressure, however, can be essentially the same or greater than that employed during subsequent catalytic hydrogenation. A pressure within the range of about 100 to about 5000 pounds per square inch gauge (about 7 to about 351 kilograms per square centimeter), preferably about 1000 to about 4000 pounds per square inch gauge (about 70 to about 281 kilograms per square inch gauge), can be used. The temperature employed during predigestion is essentially the same as that employed during catalytic hydrogenation, about 260° to about 480° C., preferably about 370° to about 454° C. The rate at which hydrogen is charged during predigestion of the slurry is usually lower than that employed during subsequent catalytic hydrogenation, but is at least sufficient to maintain the desired pressure. However, the amount of hydrogen charged can be essentially the same or greater than that employed in the catalytic hydrogenation. A preferred rate of hydrogen addition during predigestion is about 1000 to about 5000 standard cubic feet per barrel (about 178 to about 890 cubic meters per cubic meter) of carbonaceous stock slurry. The rate at which slurry is charged during predigestion may be essentially the same as that employed during the catalytic hydrogenation. However, the slurry rate during predigestion can be less than or greater than that employed during catalytic hydrogenation. The space velocity in the predigestion vessel can be about 0.1 to about 10.0 volumes of slurry per hour per volume of predigestion vessel (VHSV). The predigested slurry is thereafter used as charge stock to the reaction vessel.

The solid carbonaceous materials that can be used herein can have the following composition on a moisture-free basis:

|  | Weight Per Cent | |
|---|---|---|
|  | Broad Range | Normal Range |
| Carbon | 45 – 95 | 60 – 92 |
| Hydrogen | 2.5 – 7.0 | 4.0 – 6.0 |
| Oxygen | 2.0 – 45 | 3.0 – 25 |
| Nitrogen | 0.75 – 2.5 | 0.75 – 2.5 |
| Sulfur | 0.3 – 10 | 0.5 – 6.0 |

The carbon and hydrogen content of the carbonaceous material will reside primarily in benzene compounds, multiring aromatic compounds, heterocyclic compounds, etc. Oxygen and nitrogen are believed to be present primarily in chemical combination with the aromatic compounds. Some of the sulfur is believed to be present in chemical combination with the aromatic compounds and some in chemical combination with inorganic elements associated therewith, for example, iron and calcium.

In addition to the above, the solid carbonaceous material being treated herein may also contain solid, primarily inorganic, compounds which will not be convertible to liquid product herein, which are termed as "ash", and are composed chiefly of compounds of silicon, aluminum, iron and calcium, with smaller amounts of compounds of magnesium, titanium, sodium and potassium. The ash content of a carbonaceous material treated herein will amount to less than 50 weight percent, based on the weight of the moisture-free carbonaceous material, but in general will amount to about 0.1 to about 30 weight percent, usually about 0.5 to about 20 weight percent.

Anthracitic, bituminous and subbituminous coal, lignitic materials, and other types of coal products referred to in ASTM D-388 are exemplary of the solid carbonaceous materials which can be treated in accordance with the process of the present invention to produce upgraded products therefrom. When a raw coal is employed in the process of the invention, most efficient results are obtained when the coal has a dry fixed carbon content which does not exceed 86 percent and a dry volatile matter content of at least 14 percent by weight as determined on an ash-free basis. The coal, prior to use in the process of the invention, is preferably ground in a suitable attrition machine, such as a hammermill, to a size such that at least 50 percent of the coal will pass through a 40-mesh (U.S. Series) sieve. The ground coal is then dissolved or slurried in a suitable solvent. If desired, the solid carbonaceous material can be treated, prior to reaction herein, using any conventional means known in the art, to remove therefrom any materials forming a part thereof that will not be converted to liquid herein under the conditions of reaction.

Any liquid compound, or mixtures of such compounds, having hydrogen transfer properties can be used as solvent herein. However, liquid aromatic hydrocarbons are preferred. By "hydrogen transfer properties" we mean that such compound can, under the conditions of reaction herein absorb or otherwise take on hydrogen and also release the same. A solvent found particularly useful as a startup solvent is anthracene oil defined in Chambers' Technical Dictionary, MacMillan, Great Britain 1943, page 40, as follows: "A coal-tar fraction boiling about 518° F., consisting of anthracene, phenanthrene, chrysene, carbazole and other hydrocarbon oils." Other solvents which can be satisfactorily employed are those which are commonly used in the Pott-Broche process. Examples of these are polynuclear aromatic hydrocarbons such as naphthalene and chyrsene and their hydrogenated products such as tetralin (tetrahydronaphthalene), decalin, etc. or one or more of the foregoing in admixture with a phenolic compound such as phenol or cresol.

The selection of a specific solvent when the process of the present invention is initiated is not critical since a liquid fraction which is obtained during the defined conversion process serves as a particularly good solvent for the solid carbonaceous material. The liquid fraction which is useful as a solvent for the solid carbonaceous material, particularly coal, and which is formed during the process, is produced in a quantity which is more than sufficient to replace any solvent that is converted to other products or which is lost during the process. Thus, a portion of the liquid product which is formed in the process of the invention is advantageously recycled to the beginning of the process. It will be recognized that as the process continues, the solvent used initially becomes increasingly diluted with recycle solvent until the solvent used initially is no longer distinguishable from the recycle solvent. If the process is operated on a semicontinuous basis, the solvent which is employed at the beginning of each new period may be that which has been obtained from a previous operation. For example, liquids produced from coal in accordance with the present invention are aromatic and generally have a boiling range of about 300° to about 1400° F., a density of about 0.9 to about 1.1 and a carbon to hydrogen mol ratio in the range of about 1.3:1 to about 0.66:1. As an example, a solvent oil is obtained from a subbituminous coal, such as Wyoming-Montana coal, comprising a middle oil having a typical boiling range of about 190° to about 360° C. Thus, the solvent that is employed herein can broadly be defined as that obtained from a previous conversion of a carbonaceous solid material in accordance with the process defined herein. Although we have used the term "solvent", it is understood that such term covers the liquid wherein the liquid product obtained herein is dissolved as well as the liquid in which the solid materials are dispersed.

The ratio of solvent to solid carbonaceous material can be varied so long as a sufficient amount of solvent is employed to effect dissolution of substantially all of the solid carbonaceous material in the reaction vessel. While the weight ratio of solvent to solid carbonaceous material can be within the range of about 0.6 to about 4:1, a range of about 1:1 to about 3:1 is preferred. Best results are obtained when the weight ratio of solvent to solid carbonaceous material is about 2:1. Ratios of solvent to solid carbonaceous material greater than about 4:1 can be used but provide little significant functional advantage in dissolving or slurrying the solid carbonaceous material for use in the process of this invention. An excessive amount of solvent is undesirable in that added energy or work is required for subsequent separation of the solvent from the system.

DESCRIPTION OF PREFERRED EMBODIMENTS

Figure 1:
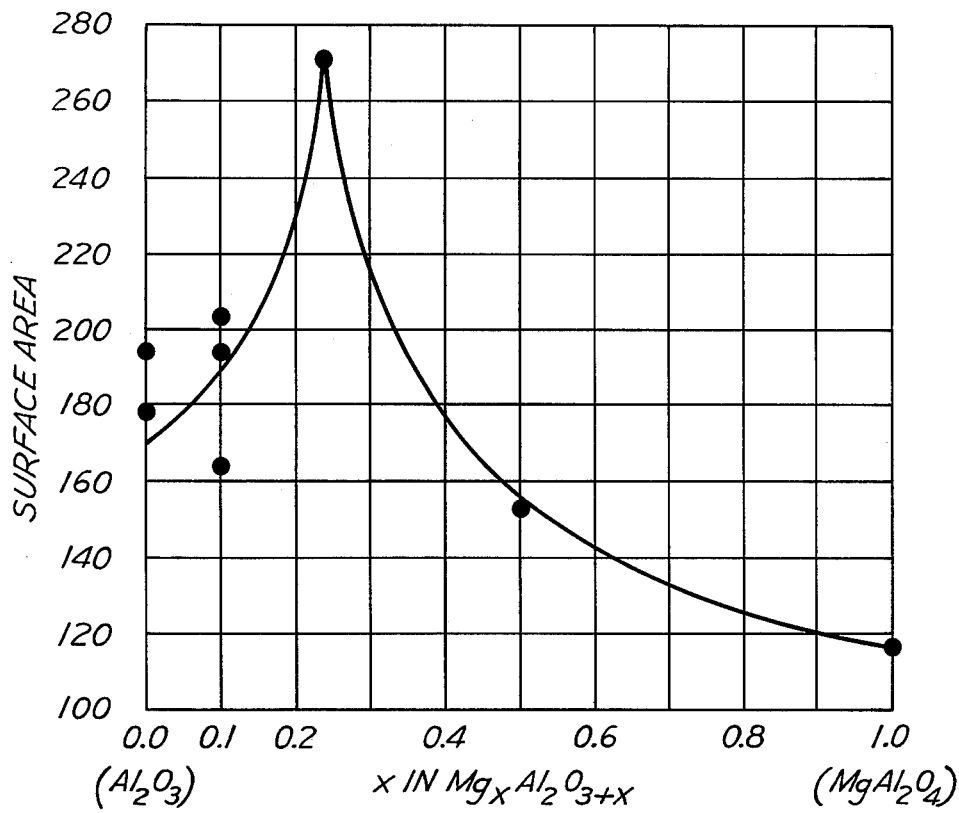

The invention defined herein can further be understood by the following.

EXAMPLE I

There was dissolved in 6 liters of distilled water 310 grams of $Mg(NO_3)_2.6H_2O$ and separately in 20 liters of distilled water 9000 grams of $Al(NO_3)_3.9H_2O$. To a mixing vessel containing 10 liters of distilled water there was added sufficient $NH_4OH$ to obtain a pH of 10.0. The magnesium salt solution and the aluminum salt solution were thoroughly mixed and the resultant mixture was slowly added to the ammonium hydroxide solution, with good stirring, additional $NH_4OH$ was added simultaneously in a separate stream at a rate which maintained the resultant pH at 10.0. Upon completion of the additions, stirring was continued for 45 minutes, followed by filtration. The filter cake was washed on the filter with 63 liters of water, followed by drying at 121° C. The dry cake was sized to 14-30 mesh and calcined at 538° C. for 10 hours. A 68.55- gram sample of the resultant filter cake was impregnated with 13.1 grams of $(NH_4)_6Mo_7O_{24}.24H_2O$, dried at 121° C. and calcined at 538° C. for 10 hours. Nickel was added by impregnation with 13.44 grams of $Ni(NO_3)_2.6H_2O$, dried at 121° C. and then calcined at 538° C. for 10 hours. Titanium was then added by impregnation with 41.3 grams of $TiCl_4$ in dilute $NH_4OH$, dried at 121° C. and then calcined at 538° C. The final product was the magnesium-deficient magnesium aluminate spinel of the formula $Mg_{0.1}Al_2O_{3.1}$ carrying 3 weight percent nickel, 5 weight percent titanium and 8 weight percent molybdenum.

EXAMPLE II

The run of Example I was repeated except that solutions of 1500 grams of $Al(NO_3)_3.9H_2O$ in 3.5 liters of distilled water and 512 grams of $Mg(NO_3)_2.6H_2O$ in 4 liters of distilled water were used. The catalyst obtained was magnesium aluminate $MgAl_2O_4$ carrying 3 weight percent nickel, 5 weight percent titanium and 8 weight percent molybdenum.

EXAMPLE III

There was combined, with good mixing solutions containing 1500 grams of $Al(NO_3)_3.9H_2O$ in 5 liters of distilled water and 128 grams of $Mg(NO_3)_2.6H_2O$ in 1 liter of distilled water. 600 grams of ammonium carbonate were dissolved in 3 liters of distilled water and, after heating to 75° C. to obtain a clear solution, and cooling, the pH was adjusted to 10 by adding $NH_4OH$ thereto. In a mixing vessel there was added 3.5 liters of water and the pH thereof was adjusted to 9.0 by addition of $NH_4OH$. The aluminum and magnesium salt solution and the ammonium carbonate solution were then added to the mixing vessel with stirring while maintaining the pH at 9.0. Upon filtration, the filter cake was treated as in Example I and nickel, titanium and molybdenum were added thereto. The final product was the magnesium-deficient magnesium aluminate spinel $Mg_{0.25}Al_2O_{3.25}$ carrying 3 weight percent nickel, 5 weight percent titanium and 8 weight percent molybdenum.

EXAMPLE IV

The procedure of Example III was followed using a solution containing 1500 grams of $Al(NO_3)_3.9H_2O$ in 3.5 liters of water and a solution containing 256 grams of $Mg(NO_3)_2.6H_2O$ in 3 liters of water. The final product obtained was the magnesium-deficient magnesium aluminate spinel $Mg_{0.5}Al_2O_{3.5}$ carrying 3 weight percent nickel, 5 weight percent titanium and 8 weight percent molybdenum.

EXAMPLE V

Example I was repeated except that the support was not calcined after impregnation with the molybdenum salt but merely dried at 121° C. This was followed, however, by impregnation with the nickel, and titanium salts as in Example I. The final product obtained was the magnesium-deficient magnesium aluminate spinel $Mg_{0.1}Al_2O_{3.1}$ carrying 3 weight percent nickel, 5 weight percent titanium and 8 weight percent molybdenum.

EXAMPLE VI

Example I was repeated except for the impregnation with the metal salts. The initial impregnation of a 145.8-gram sample was with a solution containing 24.67 grams of $(NH_4)_6Mo_7O_{24}.4H_2O$ after which the impregnated support was dried at 121° C. This was followed by impregnation with a solution containing 5.39 grams of nickel nitrate and 8.38 grams of cobalt nitrate in the proportion of one atom of nickel to two atoms of cobalt, drying at 121° C. and calcining in air at 538° C. for 10 hours. The final product obtained was the magnesium-deficient magnesium aluminate spinel $Mg_{0.1}Al_2O_{3.1}$ carrying 0.5 weight percent nickel, 1 weight percent cobalt and 8 weight percent molybdenum.

EXAMPLE VII

To the thermowell tube of a two-liter autoclave (having a rocking-type motion) eight packets of catalyst were attached. The packets were made of 40 mesh stainless steel screen and were each sized to hold 4 grams of catalyst. In each of six packets there was placed 4 grams of one of the catalysts prepared above. In the seventh packet a commercial catalyst $Al_2O_3$ carrying 0.49 weight percent nickel, 1.1 weight percent cobalt and 8.1 weight percent molybdenum was placed. In the eighth a commercial catalyst $Al_2O_3$ carrying 3.6 weight percent nickel, 5.2 weight percent titanium and 8.0 weight percent molybdenum was placed. In one series of runs, a slurry containing 225 grams of 40 mesh Big Horn coal mixed with 450 grams of anthracene oil was charged to the autoclave, after which it was sealed, pressure tested with hydrogen and vented for start-up hydrogen pressure of 200 pounds per square inch gauge (14 kilograms per square centimeter). The autoclave was heated to 427° C. over a period of 4½ hours, at which time sufficient hydrogen was charged to bring the total pressure to 3500 pounds per square inch gauge (246 kilograms per square centimeter). The autoclave was maintained at this temperature for 20 minutes and then cooled to 55° C. over a period of one hour. The reactor contents were discharged and the catalysts were recovered, washed with excess ethyl acetate, dried at 93° C. for 2 hours in a nitrogen atmosphere and screened to remove adhering dissolved coal particles. The carbon and hydrogen contents of the coked catalysts were measured using a combustion technique with measurement of $CO_2$ and water. During the hydrogenation period essentially all of the coal had been liquefied.

In a second series of runs, the process of the first series was repeated except that autoclave was maintained at 427° C. for 120 minutes and every 30 minutes sufficient hydrogen was added to increase the pressure to 3500 pounds per square inch gauge (246 kilograms per square centimeter).

A third series of runs were identical to the first except that the pressure during the reaction was maintained at 2000 pounds per square inch gauge (141 kilograms per square centimeter).

The data obtained are tabulated below in Table I.

TABLE I

| Catalyst | Pore Volume, cc/Gm | Average Pore Diameter A | Area, $M^2$/Gm | Carbon, Weight Per Cent of Total Catalyst | | | Average Amount of Carbon Deposited, Grams | Ratio of Carbon to Surface Area |
| --- | --- | --- | --- | --- | --- | --- | --- | --- |
| | | | | First Series of Runs | Second Series of Runs | Third Series of Runs | | |
| NiCoMo on $Al_2O_3$ | 0.55 | 113.8 | 194.5 | 15.98 | 18.29 | 35.07 | 23.11 | 0.119 |
| NiCoMo on $Mg_{0.1}Al_2O_{3.1}$ | 0.52 | 107.2 | 194.3 | 18.35 | 21.45 | 32.24 | 24.01 | 0.124 |
| NiTiMo on $Al_2O_3$ | 0.43 | 96.0 | 179.2 | 16.72 | 19.24 | 30.12 | 22.03 | 0.123 |
| *NiTiMo on $Mg_{0.1}Al_2O_{3.1}$ | 0.43 | 106.6 | 163.0 | 17.68 | 17.61 | 28.93 | 21.40 | 0.131 |
| **NiTiMo on $Mg_{0.1}Al_2O_{3.1}$ | 0.47 | 91.8 | 203.6 | 18.80 | 18.64 | 30.33 | 22.59 | 0.111 |
| NiTiMo on $Mg_{0.25}Al_2O_{3.25}$ | 0.59 | 86.8 | 272.1 | 21.03 | 20.20 | 26.57 | 22.60 | 0.083 |
| NiTiMo on $Mg_{0.5}Al_2O_{3.5}$ | 0.37 | 97.2 | 152.7 | 16.13 | 14.85 | 25.87 | 18.95 | 0.121 |
| NiTiMo on $MgAl_2O_4$ | 0.28 | 96.4 | 116.7 | 8.85 | 12.40 | 19.95 | 13.73 | 0.118 |

*Catalyst of Example V
**Catalyst of Example I

Figure 2:
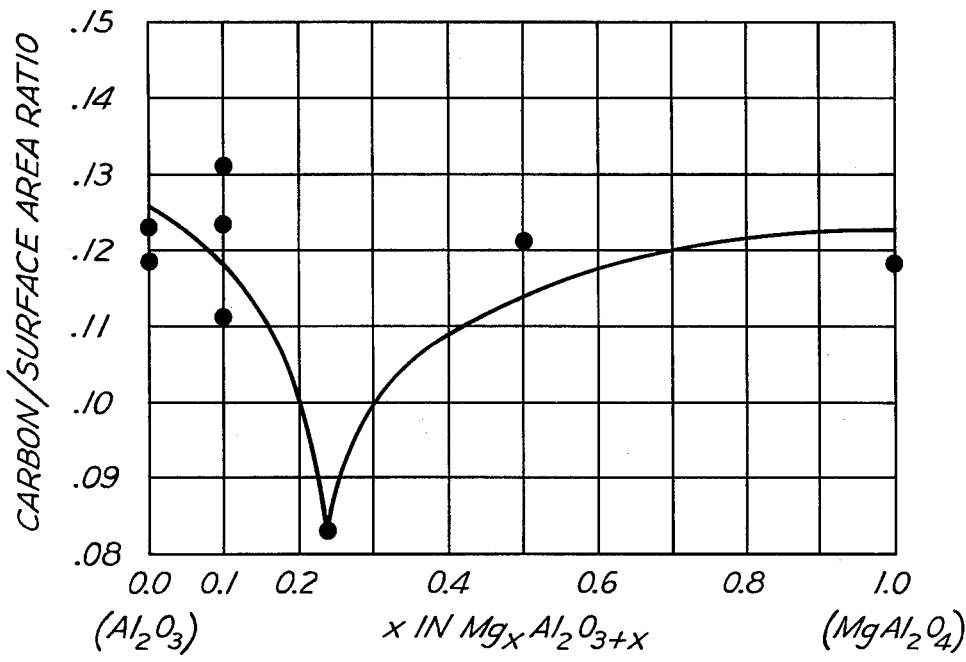

The data in Table I are graphically illustrated in FIGS. 1 and 2, wherein the surface area and the ratio of carbon to surface area are plotted against catalysts having $Al_2O_3$, $MgAl_2O_4$ and magnesium-deficient magnesium aluminate spinels as supports. Note that greatest carbon deposition occurs when the support approaches $Al_2O_3$ alone or $MgAl_2O_4$ alone, but arrives at a minimum when a magnesium-deficient magnesium aluminate spinel as defined herein is used.

Obviously, many modifications and variations, as hereinabove set forth, can be made without departing from the spirit and scope thereof and, therefore, only such limitations should be imposed as are indicated in the appended claims.

We claim:

1. A process for hydrogenating a carbonaceous material which comprises subjecting said carbonaceous material, together with hydrogen, under hydrogenation conditions in the presence of a catalyst comprising a magnesium-deficient magnesium aluminate spinel of the following formula:

$$Mg_xAl_2O_{3+x}$$

wherein $x$ is a number ranging from about 0.10 to about 0.40, carrying nickel, titanium and molybdenum.

2. The process of claim 1 wherein $x$ is a number ranging from about 0.2 to about 0.3.

3. The process of claim 1 wherein said carbonaceous material is coal.

4. The process of claim 1 wherein said hydrogenation is carried out at a temperature of about 260° to about 480° C. and the pressure in the range of about 100 to about 5000 pounds per square inch gauge.

5. The process of claim 1 wherein said hydrogenation is carried out at a temperature of about 370° to about 454° C. and a pressure in the range of about 1000 to about 4000 pounds per square inch gauge.

6. The process of claim 1 wherein the catalyst has a pore volume of about 0.25 to about 0.8 cubic centimeters per gram, an average pore diameter of about 80 to about 130 Å and a surface area of about 70 to about 350 square meters per gram.

7. The process of claim 1 wherein the catalyst has a pore volume of about 0.45 to about 0.8 cubic centimeters per gram, an average pore diameter of about 80 to about 115 Å and a surface area of about 250 to about 300 square meters per gram.

* * * * *